United States Patent
You et al.

(10) Patent No.: US 12,474,745 B2
(45) Date of Patent: Nov. 18, 2025

(54) SUPPORT MODULE, DISPLAY MODULE AND DISPLAY DEVICE

(71) Applicants: CHENGDU BOE OPTOELECTRONICS TECHNOLOGY CO., LTD., Sichuan (CN); BOE Technology Group Co., Ltd., Beijing (CN)

(72) Inventors: Chuankun You, Beijing (CN); Zhihui Wang, Beijing (CN); Jun Zhang, Beijing (CN); Fengping Wu, Beijing (CN); Shaokui Liu, Beijing (CN); Chuan Zeng, Beijing (CN); Jia Zeng, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/271,178

(22) PCT Filed: Jul. 19, 2022

(86) PCT No.: PCT/CN2022/106354
§ 371 (c)(1),
(2) Date: Jul. 6, 2023

(87) PCT Pub. No.: WO2024/016138
PCT Pub. Date: Jan. 25, 2024

(65) Prior Publication Data
US 2024/0385658 A1    Nov. 21, 2024

(51) Int. Cl.
*G06F 1/16* (2006.01)

(52) U.S. Cl.
CPC .......... *G06F 1/1681* (2013.01); *G06F 1/1652* (2013.01); *G06F 1/1656* (2013.01)

(58) Field of Classification Search
CPC ............................ G06F 1/1652; G06F 1/1681
See application file for complete search history.

(56) References Cited

U.S. PATENT DOCUMENTS 4,802,605 A * 2/1989 Salmon ................. G06F 1/1681
                                                                220/843
4,960,256 A * 10/1990 Chihara ................ G06F 1/1681
                                                                16/361

(Continued)

FOREIGN PATENT DOCUMENTS

| CN | 111698355 A | 9/2020 |
| CN | 113542457 A | 10/2021 |

(Continued)

*Primary Examiner* — Adrian S Wilson
(74) *Attorney, Agent, or Firm* — WHDA, LLP (57) ABSTRACT

The supporting module includes a supporting assembly including a fixed plate and a movable plate, and both sides of fixed plate are hinged with one movable plate; a synchronous assembly is fixed on the fixed plate, transmission assemblies are located at a bottom of the movable plate and a bottom of the fixed plate, a bottom surface of each movable plate is movably connected to a first end of one transmission assembly, and second ends of the transmission assemblies located at both sides of the fixed plate are movably connected to the synchronous assembly; when a first included angle is disposed between a supporting surface of one movable plate and a supporting surface of the fixed plate, a supporting surface of the other movable plate keeps the first included angle with the supporting surface of the fixed plate under an action of the transmission assembly and the synchronous assembly.

18 Claims, 6 Drawing Sheets

(56) References Cited

U.S. PATENT DOCUMENTS

| | | | |
|---|---|---|---|
| 9,173,287 B1 * | 10/2015 | Kim | G06F 1/1652 |
| 9,173,288 B1 * | 10/2015 | Kim | G06F 1/1681 |
| 9,179,559 B1 * | 11/2015 | Kim | H04M 1/022 |
| 10,480,225 B1 | 11/2019 | Hsu et al. | |
| 12,174,669 B2 * | 12/2024 | You | G06F 1/1681 |
| 2015/0241925 A1 * | 8/2015 | Seo | G06F 1/1652 |
| | | | 361/679.27 |
| 2015/0257289 A1 * | 9/2015 | Lee | H05K 5/30 |
| | | | 361/749 |
| 2016/0085265 A1 * | 3/2016 | Park | H04M 1/0268 |
| | | | 361/807 |
| 2021/0368032 A1 | 11/2021 | Liao et al. | |
| 2023/0171334 A1 | 6/2023 | Xu et al. | |
| 2023/0229189 A1 | 7/2023 | Li et al. | |
| 2023/0244274 A1 | 8/2023 | Lin et al. | |
| 2024/0241552 A1 * | 7/2024 | Zhang | G06F 1/16 |
| 2024/0288902 A1 * | 8/2024 | You | F16C 11/04 |
| 2024/0288903 A1 * | 8/2024 | Zhang | G06F 1/1652 |

FOREIGN PATENT DOCUMENTS

| | | | |
|---|---|---|---|
| CN | 113643612 A | 11/2021 | |
| CN | 113805646 A | 12/2021 | |
| CN | 114333566 A | 4/2022 | |

\* cited by examiner

SUPPORT MODULE, DISPLAY MODULE AND DISPLAY DEVICE

TECHNICAL FIELD

The present disclosure relates to the field of display devices and, more particularly, to a supporting module, a display module and a display device.

BACKGROUND

With the continuous development of electronics, performances of display devices are becoming more and more powerful. At present, in order to enrich the visual experience of the display devices, flexible display screens of the display devices may be folded.

At present, the flexible display screen is usually arranged on a supporting module, and the flexible display screen may be folded through a folding rotating shaft arranged on the supporting module. However, at present, the flexible display screen is usually folded in a wedge-shaped way, which makes a thickness of the folded supporting module thicker, affecting lightweight design of the display device, and leading to obvious creases of the folded flexible display screen, thus affecting a display effect of the display device.

SUMMARY

The embodiments of the present disclosure aim to provide a supporting module, a display module and a display device, which can solve problems that the folded supporting module is relatively thicker and has obvious creases.

In a first aspect, the embodiments of the present disclosure provide a supporting module for supporting a flexible display screen, wherein the supporting module includes a supporting assembly, transmission assemblies and a synchronous assembly;

the supporting assembly includes a fixed plate and movable plates, and both sides of the fixed plate are hinged with one movable plate;

the synchronous assembly is fixed on the fixed plate, and the transmission assemblies are located at a bottom of the movable plate and a bottom of the fixed plate;

a bottom surface of each movable plate is movably connected to a first end of one transmission assembly, and second ends of the transmission assemblies located at both sides of the fixed plate are movably connected to the synchronous assembly;

when a first included angle is disposed between a supporting surface of one movable plate and a supporting surface of the fixed plate, a supporting surface of the other movable plate keeps the first included angle with the supporting surface of the fixed plate under an action of the transmission assembly and the synchronous assembly;

wherein the supporting surface of the movable plate and the supporting surface of the fixed plate are both surfaces for supporting the flexible display screen, and the bottom surface of the movable plate is one surface opposite to the supporting surface of the movable plate.

Optionally, the transmission assembly includes a tooth arm and a pin, the synchronous assembly includes a synchronous gear set, and the bottom surface of the movable plate is provided with a first supporting lug;

a first end of the tooth arm is provided with a hinging hole, a second end of the tooth arm is a tooth surface, and an axis of the hinging hole is parallel to an axis of any gear in the synchronous gear set;

the first supporting lug protrudes from the bottom surface of the movable plate, a first arc chute is formed in the first supporting lug, and the pin passes through the hinging hole and the first arc chute, so that the first end of the tooth arm is hinged with the movable plate; and any one of the two gears in the synchronous gear set is meshed with the second end of one tooth arm.

Optionally, the synchronous assembly further includes a synchronous rod; and the second end of the tooth arm is provided with a through hole, and both ends of the synchronous rod are both fixedly connected to one tooth arm through the through hole.

Optionally, cross sections of a first position and a second position of the synchronous rod along a direction perpendicular to an axis of the synchronous rod are non-circular cross sections; and a hole shape of the through hole is consistent with a shape of the non-circular section, and the first position and the second position are positions at which the synchronous rod and the tooth arm are matched and connected.

Optionally, the supporting assembly further includes a connecting plate;

a bottom surface of the connecting plate is provided with a second supporting lug, and the second supporting lug protrudes from a bottom surface of the connecting plate;

the second supporting lug is provided with a second arc chute, the connecting plate is movably connected to the bottom of the movable plate, projections of the first supporting lug and the second supporting lug on a first plane along an axis direction of the pin are overlapped, and projections of the first arc chute and the second arc chute on the first plane along the axis direction of the pin are overlapped, wherein the first plane is a plane perpendicular to the movable plate;

the pin passes through the first arc chute and the second arc chute, so that the first end of the tooth arm is hinged with the connecting plate; and the connecting plate is configured for fixing a middle frame of the flexible display screen.

Optionally, the fixed plate includes a supporting seat and a back cover, and a side edge of the movable plate close to the fixed plate is provided with an arc guiding plate;

the supporting seat and the back cover are connected to form an installation cavity;

the synchronous assembly is installed in the installation cavity, and the arc guiding plate is movably connected in the installation cavity; and the arc guiding plate is provided with an arc surface, the arc surface is projected into an arc shape on the flexible display screen along a first direction, and the first direction is a direction perpendicular to the flexible display screen.

Optionally, the back cover is semi-cylindrical.

Optionally, the bottom surface of the movable plate is provided with a first arc guiding groove and a first arc guiding block;

the bottom surface of the connecting plate is provided with a second arc guiding groove and a second arc guiding block; and the first arc guiding block is embedded in the second arc guiding groove, and the second arc guiding block is embedded in the first arc guiding groove.

Optionally, the bottom surface of the movable plate or the bottom surface of the connecting plate is provided with at least two convex blocks; and the first arc guiding groove or the second arc guiding groove is formed between the two convex blocks at intervals.

Optionally, a shape of a projection of the first arc guiding groove on the flexible display screen is the same as a shape of a projection of the second arc guiding groove on the flexible display screen.

Optionally, the supporting assembly further includes a torsion assembly; and the torsion assembly is arranged between two synchronous gear sets, and the torsion assembly is configured for providing a rotating friction for the synchronous gear set, and a direction of the rotating friction is opposite to a rotating direction of the synchronous gear set.

Optionally, the torsion assembly includes an elastic piece, a cam and a connecting rod, and the synchronous gear set includes two rotating gears which are meshed with each other;

both ends of the connecting rod are connected to one rotating gear, one synchronous gear set is matched and connected to one cam, and the elastic piece is arranged between the two cams;

when the first included angle is disposed between the supporting surface of the movable plate and the supporting surface of the fixed plate, the cam presses the elastic piece, and a compression amount of the elastic piece is a first compression amount; and when the supporting surface of the movable plate and the supporting surface of the fixed plate are in the same plane, the cam presses the elastic piece, the compression amount of the elastic piece is a second compression amount, and the first compression amount is greater than the second compression amount.

Optionally, an end face of the rotating gear facing the elastic piece is provided with a convex tooth, and the convex tooth is matched and connected to a cross section of the cam.

Optionally, the elastic piece is a spring or a compression disc spring.

In a second aspect, the embodiments of the present disclosure provide a display module, wherein the display module includes a flexible display screen and the supporting module stated in the first aspect; and the flexible display screen is covered on the supporting surface of the movable plate and the supporting surface of the fixed plate.

In a third aspect, the embodiments of the present disclosure provide a display device, wherein the display device includes the display module stated in the second aspect.

It can be seen from the above embodiment that in the embodiment of the present disclosure, both sides of the fixed plate are hinged with one movable plate; the synchronous assembly is fixed on the fixed plate, the transmission assemblies are located at the bottom of the movable plate and the bottom of the fixed plate, the bottom surface of each movable plate is movably connected to the first end of one transmission assembly, and the second ends of the transmission assemblies located at both sides of the fixed plate are movably connected to the synchronous assembly. Therefore, when the first included angle is disposed between the supporting surface of one movable plate and the supporting surface of the fixed plate, the supporting surface of the other movable plate keeps the first included angle with the supporting surface of the fixed plate under an action of the transmission assembly and the synchronous assembly, so that folding amounts of the two movable plates movably connected at both sides of the fixed plate are equal. In this way, when the flexible display screen needs to be folded, the included angles between the supporting surfaces of the two fixed plates and the supporting 30 surface of the movable plate are always equal, so that the flexible display screen covered on the surfaces of the two fixed plates can be completely attached, such that a distance between the bottom surfaces of the two fixed plates is further reduced, which is beneficial to reducing a folded volume of the supporting module and is beneficial to lightweight development of the supporting module. Meanwhile, as the included angles between the supporting surfaces of the two fixed plates and the supporting surface of the movable plate are always equal, the inclination angles of the two folded surfaces of the folded flexible display screen are equal, so that supporting forces and traction forces of the two fixed plates on the flexible display screen are equal, which is beneficial to lightening the creases of the flexible display screen.

BRIEF DESCRIPTION OF THE DRAWINGS

In order to more clearly illustrate the technical solutions of the embodiments of the present disclosure or the prior art, the figures that are required to describe the embodiments or the prior art may be briefly described below. Apparently, the figures that are described below are embodiments of the present disclosure, and a person skilled in the art can obtain other figures according to these figures without paying creative work.

REFERENCE NUMERALS

1—supporting assembly; 2—transmission assembly; 3—synchronous assembly; 4—torsion assembly;

11—fixed plate; 12—movable plate; 13—connecting plate; 21—tooth arm; 22—pin; 31—synchronous gear set; 32—synchronous rod; 41—elastic piece; 42—cam; 43—connecting rod; 111—supporting seat; 112—back cover; 121—first supporting lug; 122—arc guiding plate; 123—first arc guiding groove; 124—first arc guiding block; 131—second supporting lug; 132—second arc guiding groove; 133—second arc guiding block; 211—hinging hole; 212—tooth surface; 311—rotating gear; 321—first position; 322—second position; 421—cross section of a cam; 1211—first arc chute; and 1311—second arc chute.

DETAILED DESCRIPTION

The technical solutions according to the embodiments of the present disclosure may be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure fall within the protection scope of the present disclosure.

The terms "first", "second", etc. used in the specification and claims of the present disclosure are used to distinguish similar objects and are not used to describe a particular order or precedence. It should be understood that the data thus used are interchangeable where appropriate, so that the embodiments disclosed can be implemented in an order other than those illustrated or described here, and that the objects distinguished by "first", "second", etc., are usually of the same class, and the number of objects is not limited, for example, the first object may be one or more. In addition, the "and/or" in the specification and claims refers to at least one of the connected objects, and the character "/" generally means that the related objects are an "or" relationship.

Figure 1:
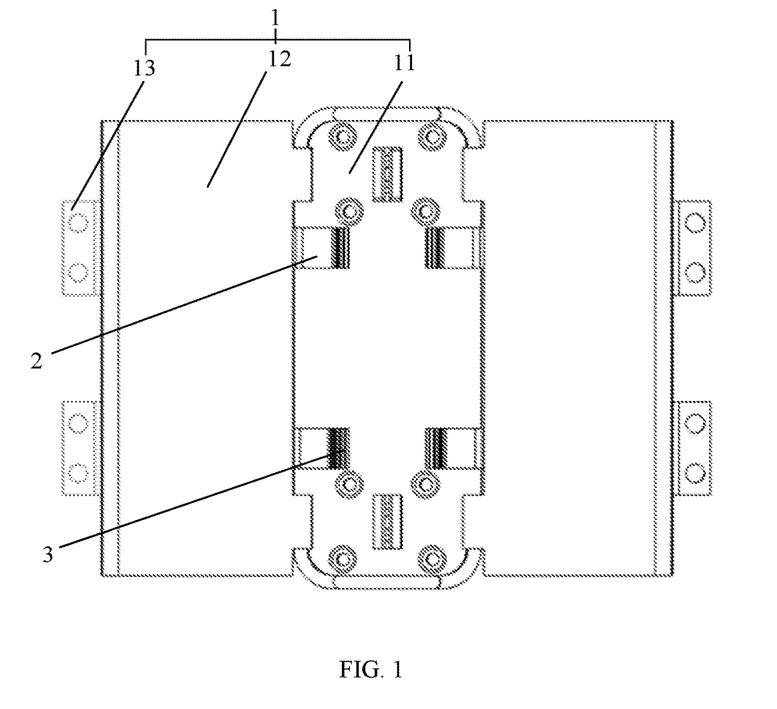
FIG. 1 is a schematic diagram showing a structure of a supporting module provided by the embodiments of the present disclosure.
Figure 2:
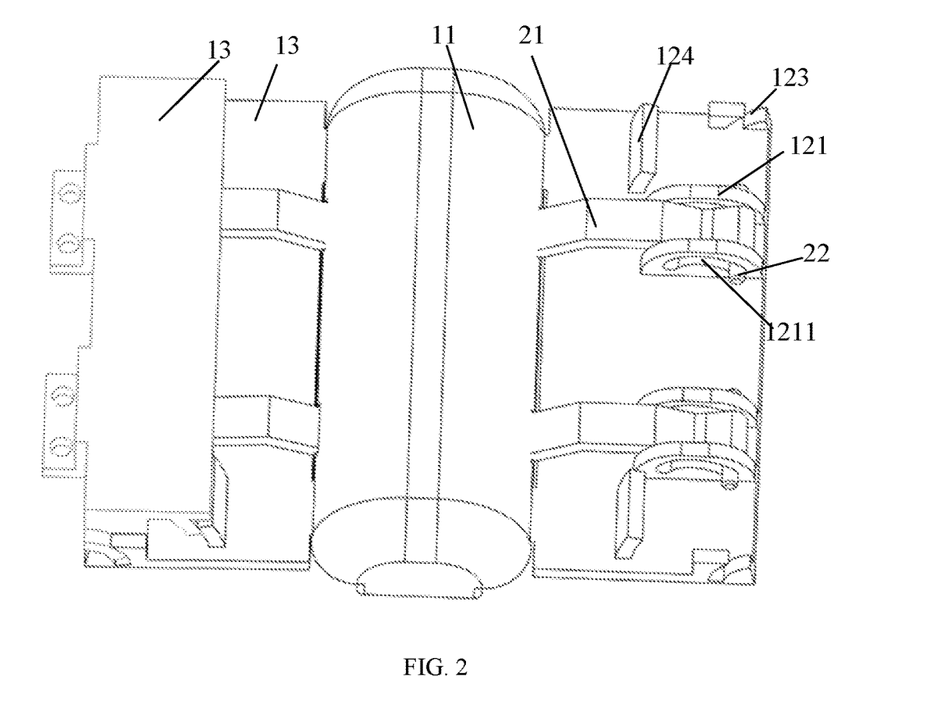
FIG. 2 is an assembly schematic diagram of a movable plate and a tooth arm provided by the embodiments of the present disclosure.
Figure 3:
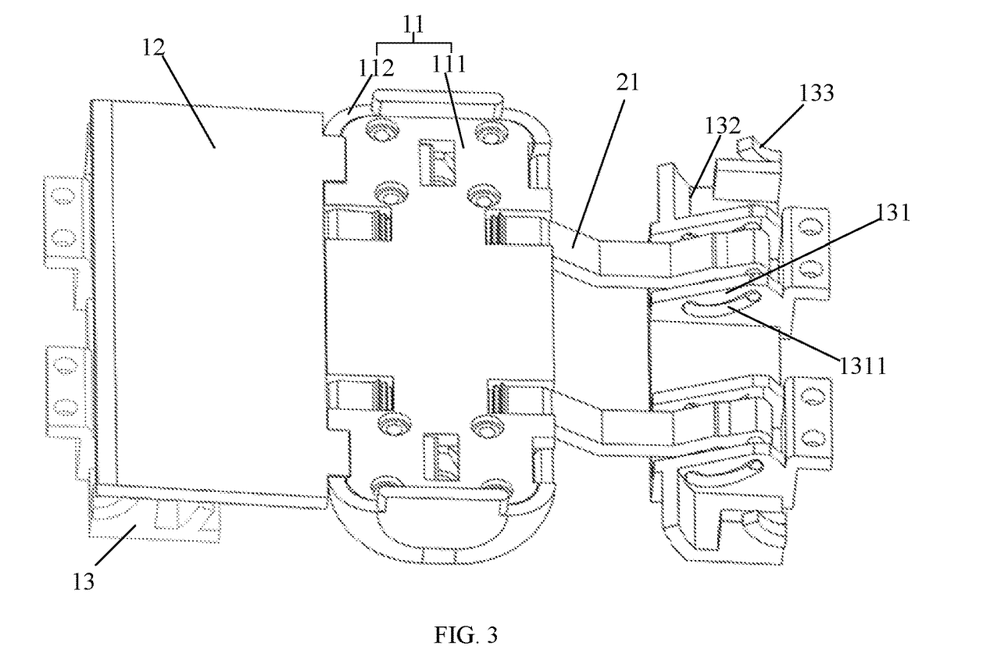
FIG. 3 is an assembly schematic diagram of the movable plate and the tooth arm provided by the embodiments of the present disclosure.

In a first aspect, a supporting module according to the embodiment of the present disclosure will be described in detail with the attached drawings. FIG. 1 is a schematic diagram showing a structure of a supporting module provided by the embodiments of the present disclosure, FIG. 2 is an assembly schematic diagram of a movable plate and a tooth arm provided by the embodiments of the present disclosure, and FIG. 3 is an assembly schematic diagram of the movable plate and the tooth arm provided by the embodiments of the present disclosure. As shown in FIG. 1, FIG. 2 and FIG. 3, the supporting module includes a supporting assembly 1, transmission assemblies 2 and a synchronous assembly 3. The supporting assembly 1 includes a fixed plate 11 and a movable plate 12, and both sides of the fixed plate 11 are hinged with one movable plate 12. The synchronous assembly 3 is fixed on the fixed plate 11, and the transmission assemblies 2 are located at a bottom of the movable plate 11 and a bottom of the fixed plate. A bottom surface of each movable plate 12 is movably connected to a first end of one transmission assembly 2, and second ends of the transmission assemblies 2 located on both sides of the fixed plate 11 are movably connected to the synchronous assembly 3. When a first included angle is disposed between a supporting surface of one movable plate 12 and a supporting surface of the fixed plate 11, a supporting surface of the other movable plate 12 keeps the first included angle with the supporting surface of the fixed plate 11 under an action of the transmission assembly 2 and the synchronous assembly 3. The supporting surface of the movable plate 12 and the supporting surface of the fixed plate 11 are both surfaces for supporting the flexible display screen, and the bottom surface of the movable plate 12 is one surface opposite to the supporting surface of the movable plate 12.

The supporting assembly 1 is not only used to supporting the flexible display screen, but also used to provide power for the folding of the flexible display screen. In the embodiments of the present disclosure, the supporting assembly 1 includes the fixed plate 11 and two movable plates 12. The two movable plates 12 are hinged at both sides of the fixed plate 11 respectively, that is, the fixed plate 11 is located between the two movable plates 12, and the flexible display screen can be folded by changing the included angle between the movable plate 12 and the fixed plate 11. It should be noted that the supporting surface of the movable plate 12 and the supporting surface of the fixed plate 11 are both planes to ensure that the flexible display screen remains flat after covering the supporting surface of the movable plate 12 and the supporting surface of the fixed plate 11. When the flexible display screen is not folded, the supporting surface of the movable plate 12 and the supporting surface of the fixed plate 11 are located in the same plane.

The transmission assemblies 2 are located at the bottom of the movable plate 13 and the bottom of the fixed plate. A bottom surface of one movable plate 12 is movably connected to a first end of one transmission assembly 2, and second ends of the transmission assembly 2 located at both sides of the fixed plate 11 are movably connected to the synchronous assembly 3, so that when a position of any movable plate 12 changes, that is, when any movable plate 12 is folded with the fixed plate 11, the transmission assembly 2 connected to the movable plate 12 drives the synchronous assembly 3 to move, and the synchronous assembly 3 drives the other transmission assembly 2 to move, thereby driving the other movable plate 12 to move, and the included angle between the supporting surfaces of the two movable plates 12 and the supporting surface of the fixed plate 11 can be equal, so that inclination angles of two folded surfaces generated when the flexible display screen is folded are equal.

It can be seen from the above embodiment that in the embodiment of the present disclosure, both sides of the fixed plate 11 are hinged with one movable plate 12; the synchronous assembly 3 is fixed on the fixed plate 11, the transmission assemblies 2 are located at the bottom of the movable plate 13 and the bottom of the fixed plate, the bottom surface of each movable plate 12 is movably connected to the first end of one transmission assembly 2, and the second ends of the transmission assembly 2 located at both sides of the fixed plate 11 are movably connected to the synchronous assembly 3. Therefore, when the first included angle is disposed between the supporting surface of one movable plate 12 and the supporting surface of the fixed plate 11, the supporting surface of the other movable plate 12 keeps the first included angle with the supporting surface of the fixed plate 11 under an action of the transmission assembly 2 and the synchronous assembly 3, so that folding amounts of the two movable plates 12 movably connected at both sides of the fixed plate 11 are equal. In this way, when the flexible display screen needs to be folded, the included angles between the supporting surfaces of the two fixed plates 11 and the supporting surface of the movable plate 12 are always equal, so that the flexible display screen covered on the surfaces of the two fixed plates 11 can be completely attached, such that a distance between the bottom surfaces of the two fixed plates 11 is further reduced, which is beneficial to reducing a folded volume of the supporting module, and is beneficial to lightweight development of the supporting module. Meanwhile, as the included angles between the supporting surfaces of the two fixed plates 11 and the supporting surface of the movable plate 12 are always equal, the inclination angles of the two folded surfaces of the folded flexible display screen are equal, so that supporting forces and traction forces of the two fixed plates 11 on the flexible display screen are equal, which is beneficial to lightening the creases of the flexible display screen.

Figure 4:
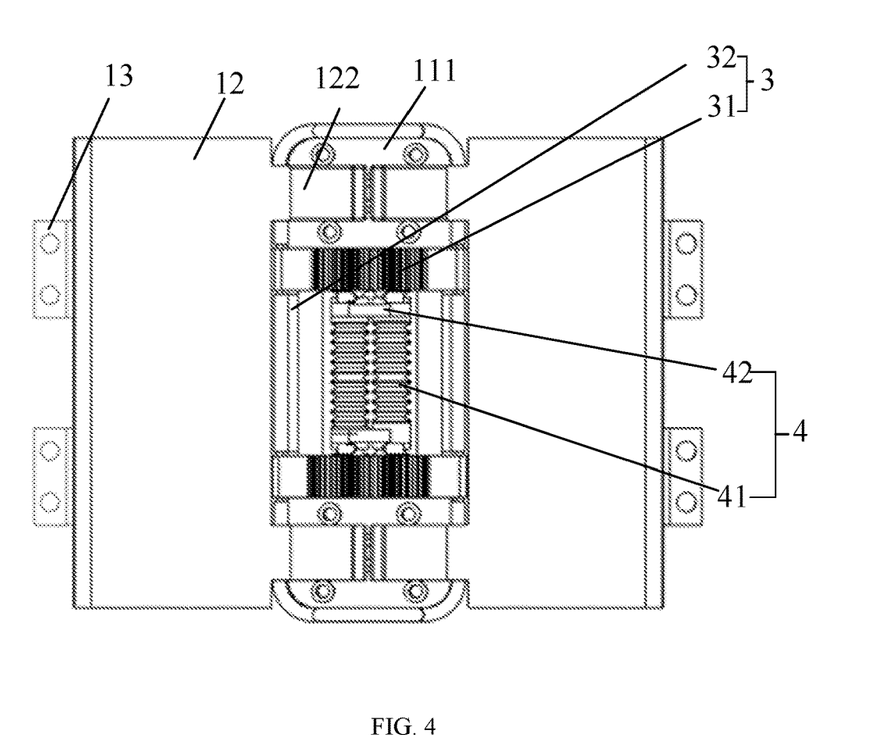
FIG. 4 is an assembly schematic diagram of the movable plate and a fixed plate provided by the embodiments of the present disclosure.
Figure 7:
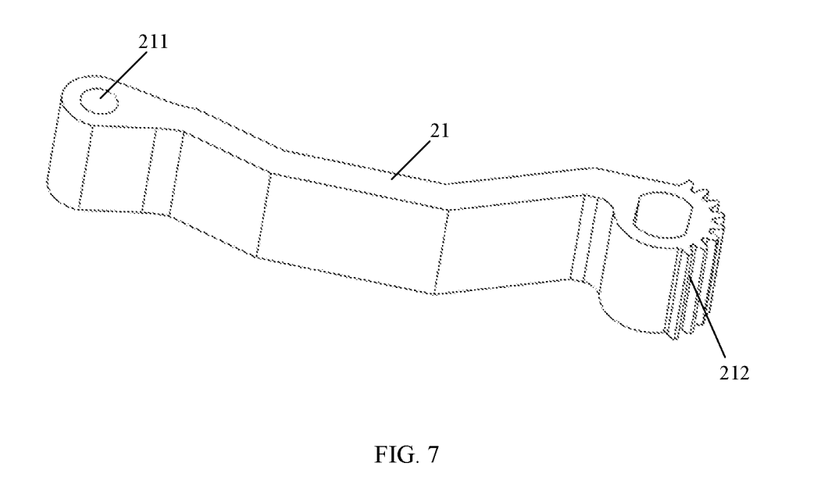
FIG. 7 is a schematic diagram showing a structure of the tooth arm provided by the embodiments of the present disclosure.

A specific structure of the transmission assembly 2 and an assembly mode of the transmission assembly 2 and the synchronous assembly 3 are described in detail as follows:

In some embodiments, as shown in FIG. 2, FIG. 4 and FIG. 7, the transmission assembly 2 includes a tooth arm 21 and a pin 22. The synchronous assembly 3 includes a synchronous gear set 31. The bottom surface of the movable plate 12 is provided with a first supporting lug 121. A first end of the tooth arm 21 is provided with a hinging hole 211, a second end of the tooth arm 21 is a tooth surface 212, and an axis of the hinging hole 211 is parallel to an axis of any gear in the synchronous gear set 31. The first supporting lug 121 protrudes from the bottom surface of the movable plate 12, a first arc chute 1211 is formed in the first supporting lug 121, and the pin 22 passes through the hinging hole 211 and the first arc chute 1211, so that the first end of the tooth arm 21 is hinged with the movable plate 12. Any gear in the synchronous gear set 31 is meshed with the second end of one tooth arm 21.

It should be noted that the tooth arm 21 may be a segmented structure, and an included angle is disposed between two adjacent segments, so that the tooth arm 21 can bear a large torsional force and avoid the deformation or damage of the tooth arm 21 due to the torsional force. The first end of the tooth arm 21 and the second end of the tooth arm 21 are two ends in a length direction of the tooth arm 21, the first end of the tooth arm 21 is provided with the hinging hole 211, and the second end of the tooth arm 21 is the tooth surface 212. The pin 22 passes through the hinging hole 211 and the first arc chute 1211 formed in the first supporting lug 121 to realize the hinge between the tooth arm 21 and the movable plate 12, and the tooth surface 212 is meshed with one gear in the synchronous gear set 31 to realize the connection between the tooth arm 21 and the synchronous gear set 31. In this way, when one movable plate 12 rotates, the pin 22 slides in the first arc chute 1211, and the tooth arm 21 drives the synchronous gear set 31 to rotate. The rotation of the synchronous gear set 31 makes the other tooth arm 21 connected to the synchronous gear set 31 rotate, and then drives the other movable plate 12 to rotate by the same amount, thus ensuring that the included angles between the supporting surfaces of the two fixed plates 11 and the supporting surface of the movable plate 12 are always equal.

It should be noted that the first supporting lug 121 is a sheet-like structure protruding from the bottom surface of the movable plate 12, and the sheet-like structure may be square, semi-circular or other shapes, which is not limited by the embodiments of the present disclosure. A projection of the first arc chute 1211 formed on the first arc chute 121 on a plane perpendicular to the flexible display screen is arc-shaped, and the first arc chute 1211 is concave to the supporting surface of the movable plate 12 to ensure that a motion track of the pin 22 is arc-shaped.

It should also be noted that in order to keep the movable plates 12 arranged at both sides of the fixed plate 11 stable during folding, the bottom surface of each movable plate 12 is movably connected to at least two tooth arms 21, and the numbers of the tooth arms 21 movably connected to the bottom surfaces of the two movable plates 12 are equal, so that the movable plates 12 at both sides of the fixed plate 11 can be folded synchronously, and the folding stability of both sides of the fixed plate 11 can be ensured.

Figure 6:
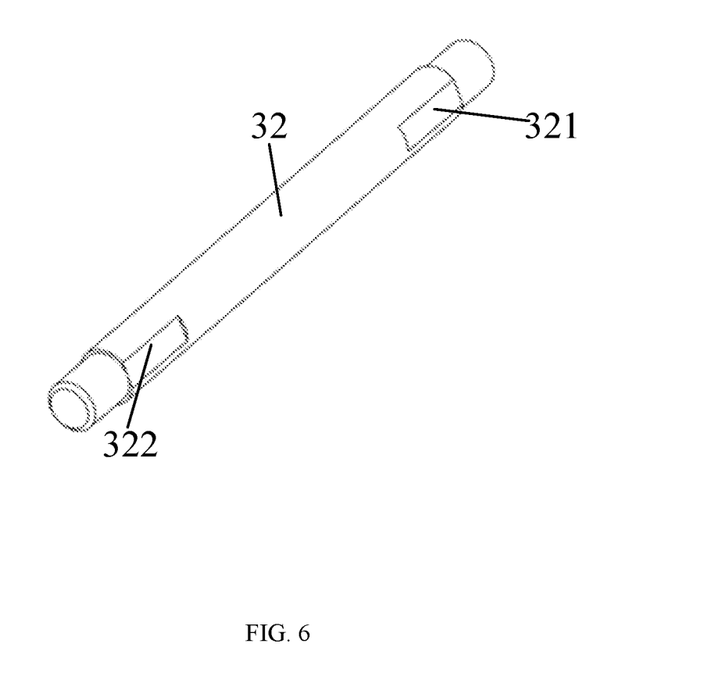
FIG. 6 is a schematic diagram showing a structure of a synchronous lever provided by the embodiments of the present disclosure.

In some embodiments, the synchronous assembly 3 further includes a synchronous rod 32. The second end of the tooth arm 21 is provided with a through hole, and both ends of the synchronous rod 32 are fixedly connected to one tooth arm 21 through the through hole.

It should be noted that both ends of the synchronous rod 32 are connected to the second end of one tooth arm 21. In this way, when any tooth arm 21 connected to the same synchronous rod 32 rotates, the other tooth arm 21 may be driven to rotate through the synchronous rod 32, so that the two tooth arms 21 on the same synchronous rod 32 can rotate synchronously.

Optionally, as shown in FIG. 6, in order to avoid relative rotation between the synchronous rod 32 and the tooth arm 21 and ensure the synchronous rotation of the two tooth arms 21 on the same synchronous rod 32, cross sections of a first position 321 and a second position 322 of the synchronous rod 32 along a direction perpendicular to an axis of the synchronous rod 32 are non-circular sections. A hole shape of the through hole is consistent with a shape of the non-circular section, and the first position 321 and the second position 322 are positions at which the synchronous rod 32 and the tooth arm 21 are matched and connected. In this way, after the tooth arm 21 is connected at the first position 321 and the second position 322 of the synchronous rod 32, relative rotation between the tooth arm 21 and the synchronous rod 32 can be avoided, such that when any tooth arm 21 connected to the synchronous rod 32 rotates, the other tooth arm 21 may be driven to rotate by the synchronous rod 32.

Figure 5:
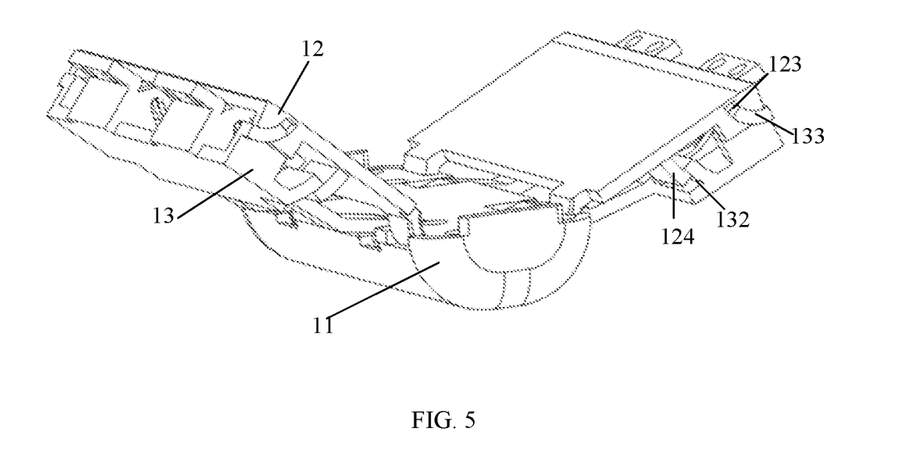
FIG. 5 is a schematic diagram showing a structure of the supporting module in a folded state provided by the embodiments of the present disclosure.

Moreover, in some embodiments, as shown in FIG. 3 and FIG. 5, the supporting module further includes a connecting plate 13. A bottom surface of the connecting plate 13 is provided with a second supporting lug 131, and the second supporting lug 131 protrudes from the bottom surface of the connecting plate 13. The second supporting lug 131 is provided with a second arc chute 1311, the connecting plate 13 is movably connected to the bottom of the movable plate 12, projections of the first supporting lug 121 and the second supporting lug 131 on a first plane along an axis direction of the pin 22 are overlapped, and projections of the first arc chute 1211 and the second arc chute 1311 on the first plane along the axis direction of the pin are overlapped, wherein the first plane is a plane perpendicular to the movable plate 12. The pin 22 passes through the first arc chute 1211 and the second arc chute 1311, so that the first end of the tooth arm 21 is hinged with the connecting plate 13. The connecting plate 13 is configured for fixing a middle frame of the flexible display screen.

It should be noted that a first side of the connecting plate 13 may be provided with convex ribs. The convex ribs extend out of the first side of the connecting plate 13. The first side of the connecting plate 13 is the side of the connecting plate 13 away from the movable plate and located on a connecting line between the two connecting plates 13. Threaded holes may be formed in the convex ribs, and the connecting plate 13 and the middle frame may be connected through threads to fix the connecting plate 13 and the middle frame. Similar to the first supporting lug 121 arranged on the bottom surface of the movable plate 12, a bottom of the connecting plate 13 is provided with a second supporting lug 131, and the second supporting lug 131 is provided with a second arc chute 1311. After the connecting plate 13 and the movable plate 12 are stuck, the first arc chute 1211 and the second arc chute 1311 are aligned, and then the pin 22 passes through the first arc chute 1211 and the second arc chute 1311 at the same time, such that the first end of the tooth arm 21 is hinged with the connecting plate 13 and the movable plate 12 at the same time. In this way, when the middle frame rotates, the middle frame can drive the connecting plate 13 to rotate, and the connecting plate 13 rotates to drive the movable plate 12 to rotate, so that the tooth arm 21 connected to the bottom surface of the movable plate 12 and the bottom surface of the connecting plate 13 rotates, and finally, the middle frame connected to the other side of the fixed plate 11 rotates by the same angle.

It should also be noted that in order to improve a connection stability between the tooth arm 21 and the connecting plate 13, and a connection stability between the tooth arm 21 and the movable plate 12, the movable plate 12 is provided with two first supporting lugs 121 at a joint with the tooth arm 21, and the connecting plate 13 is provided with two second supporting lugs 131 at a joint with the tooth arm 21. The two first supporting lugs 121 are arranged at intervals and the two second supporting lugs 131 are arranged at intervals. The tooth arm 21 is connected between the two first supporting lugs 121, and the two first supporting lugs 121 are arranged between the two second supporting lugs 131. In this way, both ends of the pin 22 are connected to one first supporting lug 121 and one second supporting lug 131, which further improves the connection stability between the tooth arm 21 and the connecting plate 13 and the connection stability between the tooth arm 21 and the movable plate 12.

Optionally, as shown in FIG. 3 and FIG. 4, the fixed plate 4 includes a supporting seat 111 and a back cover 112, and a side edge of the movable plate 12 close to the fixed plate 11 is provided with an arc guiding plate 122. The supporting seat 111 and the back cover 112 are connected to form an installation cavity. The synchronous assembly 3 is installed in the installation cavity, and the arc guiding plate 122 is movably connected in the installation cavity. The arc guiding plate 122 is provided with an arc surface, the arc surface is projected into an arc shape on the flexible display screen along a first direction, and the first direction is a direction perpendicular to the flexible display screen.

Figure 11:
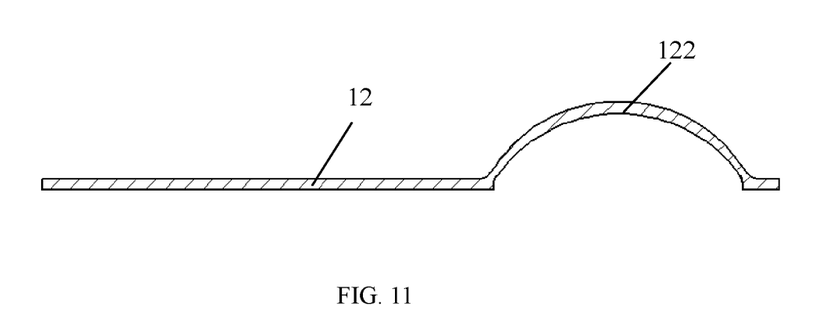
FIG. 11 is a schematic diagram showing a cross-section of the movable plate provided by the embodiments of the present disclosure.

It should be noted that, as shown in FIG. 11, as the arc guiding plate 122 has an arc surface, a projection of the arc surface on the flexible display screen in the first direction is an arc shape, and the first direction is a direction perpendicular to the flexible display screen, after the arc guiding plate 122 is movably connected between the supporting seat 111 and the back cover 112 to form the installation cavity, the arc guiding plate 122 can rotate around an axis of the installation cavity. Specifically, in the process of rotation, the middle frame rotates to drive 30 the connecting plate 13 to rotate, and the pin 22 slides in the connecting plate 13 to drive the tooth arm 21, and at the same time, the pin 22 also slides in the movable plate 12. Because the arc guiding plate 122 arranged on the movable plate 12 can rotate around an axis of the installation cavity, the connecting plate 13 and the movable plate 12 are movably connected, so that the movable plate 12 also moves, and the connecting plate 13 rotates in a non-arc shape. In this way, during the folding process, the flexible display screen may form a water drop shape under the action of the movable plate 12, so that the supporting surface of the movable plate 12 is always close to the flexible display screen, and the folding process of the flexible display screen is compensated, so that a gap between the supporting surface of the movable plate 12 and the flexible display screen can be reduced, and creases of the folded flexible display screen can be reduced.

In addition, the back cover 112 may be a square shell, a cylindrical shell, or a shell with other shapes, which is not limited by the embodiments of the present disclosure. Optionally, the back cover 112 is semi-cylindrical, so that on one hand, the back cover can provide sufficient installation space for the synchronous assembly 3; on the other hand, the semi-cylindrical back cover 112 is beneficial to saving space occupied by the fixed plate 11 and reducing a volume of the supporting module.

Optionally, in order to realize the movable connection between the fixed plate 11 and the movable plate 12, in one possible embodiment, as shown in FIG. 2, FIG. 3 and FIG. 6, the bottom surface of the movable plate 12 is provided with a first arc guiding groove 123 and a first arc guiding block 124. The bottom surface of the connecting plate 13 is provided with a second arc guiding groove 132 and a second arc guiding block 133. The first arc guiding block 124 is embedded in the second arc guiding groove 132, and the second arc guiding block 133 is embedded in the first arc guiding groove 123. Specifically, in the process of rotation, the middle frame rotates to drive the connecting plate 13 to rotate, the pin 22 slides in the connecting plate 13 to drive the tooth arm 21, and at the same time, the pin 22 also slides in the movable plate 12. Because the arc guiding plate 122 arranged on the movable plate 12 can rotate around the axis of the installation cavity, the first arc guiding block 124 rotates in the second arc guiding groove 132, and the second arc guiding block 133 rotates in the first arc guiding groove 123, so that the movable plate 12 also moves, and the connecting plate 13 rotates in a non-arc manner.

It should be noted that the first arc guiding groove 123 and the second arc guiding groove 132 may be formed by two convex blocks, may also be formed by one arc plate, or may also be formed by other forms, which is not limited by the embodiments of the present disclosure.

In one possible embodiment, the bottom surface of the movable plate 12 or the bottom surface of the connecting plate 13 is provided with at least two convex blocks. The first arc guiding groove 123 or the second arc guiding groove 132 is formed between the two convex blocks at intervals. In this way, when the first arc guiding block 124 is embedded in the two convex blocks or the second arc guiding block 133 is embedded in the two convex blocks, not only can the first arc guiding block 124 or the second arc guiding block 133 slide in the arc guiding groove formed between the two convex blocks, but also can be limited by the two convex blocks, so that an activity between the movable plate 12 and the connecting plate 13 is more stable.

Optionally, a shape of a projection of the first arc guiding groove 123 on the flexible display screen is the same as a shape of a projection of the second arc guiding groove 132 on the flexible display screen. In this way, motion tracks of the connecting plate 13 and the movable plate 12 are ensured to be consistent, which is beneficial to improving a movement stability between the connecting plate 13 and the movable plate 12. It should be noted that the shape of the projection of the first arc guiding groove 123 on the flexible display screen and the shape of the projection of the second arc guiding groove 132 on the flexible display screen may have errors within a range permitted by a processing technology. For example, in the case of machining the first arc guiding groove 123 and the second arc guiding groove 132 by drilling, a projection size of the first arc guiding groove 123 on the flexible display screen in the first direction and a projection size of the second arc guiding groove 132 on the flexible display screen in the first direction may differ by any value between 0.10 mm and 0.14 mm. The first direction is the direction parallel to a plane at which the flexible display screen is located.

In order to keep the first included angle between the supporting surface of the movable plate 12 and the supporting surface of the fixed plate 11 at any angle, in some embodiments, as shown in FIG. 4, the supporting assembly 1 further includes a torsion assembly 4. The torsion assembly 4 is arranged between two synchronous gear sets 31, and the torsion assembly 4 is configured for providing a rotating friction for the synchronous gear set 31, and a direction of the rotating friction is opposite to a rotating direction of the synchronous gear set 31. In this way, the torsion assembly 4 can provide the synchronous gear set 31 with the rotating friction opposite to the rotating direction, so that the synchronous gear set 31 can be kept in this rotating state without external force, and the tooth arm 21 meshed with the synchronous gear set 31 can be kept still, so that a folding state of the two movable plates 12 can be kept unchanged, and the flexible display screen can be kept in any folding state.

Figure 8:
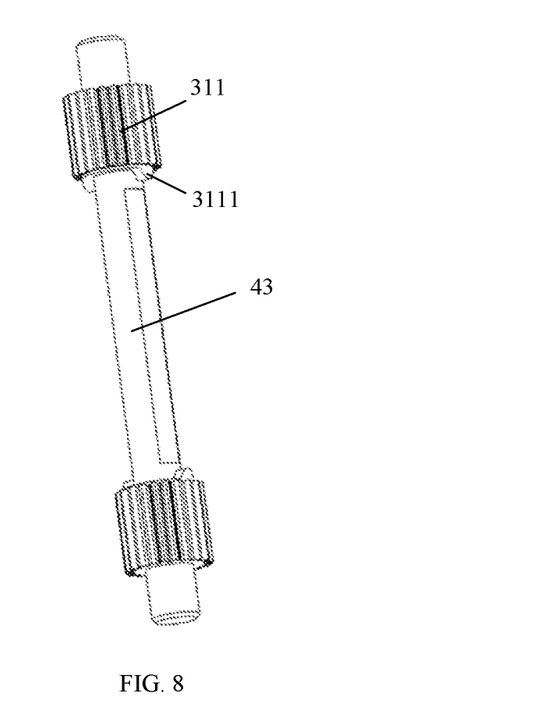
FIG. 8 is an assembly schematic diagram of a connecting rod and a synchronous gear set provided by the embodiments of the present disclosure.
Figure 9:
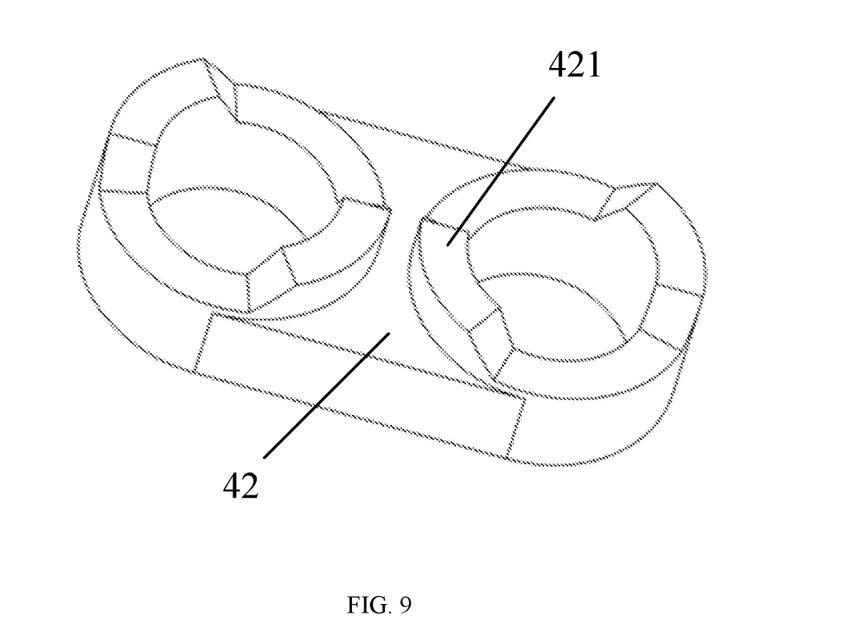
FIG. 9 is a schematic diagram showing a structure of a cam provided by the embodiments of the present disclosure.
Figure 10:
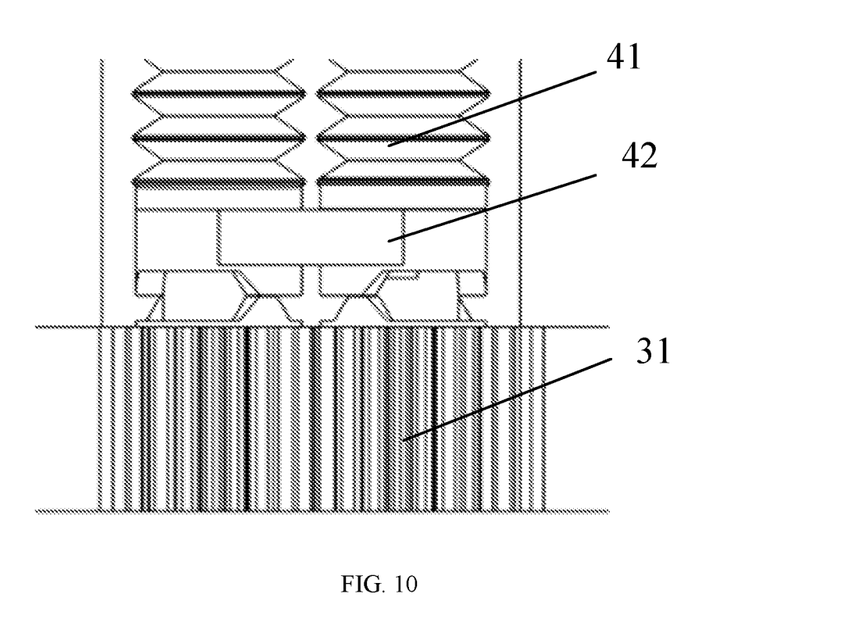
FIG. 10 is an assembly schematic diagram of the cam and the synchronous gear set provided by the embodiments of the present disclosure.

Optionally, as shown in FIG. 8, FIG. 9 and FIG. 10, the torsion assembly 4 includes an elastic piece 41, a cam 42 and a connecting rod 43. The synchronous gear set 31 includes two rotating gears 311 which are meshed with each other. Both ends of the connecting rod 43 are connected to one rotating gear 311. One synchronous gear set 31 is matched and connected to one cam 42, and the elastic piece 41 is arranged between the two cams 42. When the first included angle is disposed between the supporting surface of the movable plate 12 and the supporting surface of the fixed plate 11, the cam 42 presses the elastic piece 41, and a compression amount of the elastic piece 41 is a first compression amount. When the supporting surface of the movable plate 12 and the supporting surface of the fixed plate 11 are in the same plane, the cam 42 presses the elastic piece 41, the compression amount of the elastic piece 41 is a second compression amount, and the first compression amount is greater than the second compression amount.

It should be noted that because two mutually meshed gears are connected to one cam 42, one synchronous gear set 31 is matched and connected to one cam 42, and the elastic piece 41 is arranged between the two cams 42, when the synchronous gear set 31 rotates under the action of the tooth arm 21, the two cams 42 move in a direction of approaching each other, and then the elastic piece 41 is pressed, so that the elastic piece 41 is compressed, and the compressed elastic piece 41 gives the cam 42 a reaction force, increasing a friction between the cam 42 and the synchronous gear set 31, and then providing a varying torque to the synchronous gear set 31, such that the synchronous gear set 31 is kept in this rotating state, so that the tooth arm 21 meshed with the synchronous gear set 31 keeps stationary, and the folding state of the two movable plates 12 remains unchanged. It should also be noted that since the cam 42 is integrated on the synchronous gear set 31, a number of parts can be reduced, and an accumulated gap can be reduced, which is beneficial to maintaining a structural stability of the whole torsion assembly 4.

Optionally, as shown in FIG. 8 and FIG. 9, an end face of the rotating gear 311 facing the elastic piece 41 is provided with a convex tooth, and the convex tooth is matched and connected to a cross section 421 of the cam 42. It should be noted that when the rotating gear 311 rotates, and when the convex tooth on the end face of the rotating gear 311 contacts with a convex part of the cross section 421 of the cam 42, the cam 42 is pushed out by the convex tooth, and then moves in a direction closing to the elastic piece 41, so that the elastic piece 41 is compressed. In addition, the cam 42 may be arranged separately from the synchronous gear 42, and the above-mentioned effects can also be achieved, which will not be described in detail in the embodiment of the present disclosure.

Optionally, the elastic piece 41 is a spring or a compression disc spring. It should be noted that since the elastic piece 41 is arranged between the two cams 42, when the elastic piece 41 is compressed, the elastic piece may be pressed by the two cams 42, and then the compression amount may be doubled, thus further increasing the friction between the cams 42 and the synchronous gear set 31.

It can be seen from the above embodiment that in the embodiment of the present disclosure, because both sides of the fixed plate 11 are hinged with one movable plate 12, the synchronous assembly 3 is fixed on the fixed plate 11, the transmission assemblies 2 are located at the bottom of the movable plate 13 and the bottom of the fixed plate, the bottom surface of each movable plate 12 is movably connected to the first end of one transmission assembly 2, and the second ends of the transmission assembly 2 located at both sides of the fixed plate 11 are movably connected to the synchronous assembly 3. Therefore, when the first included angle is disposed between the supporting surface of one movable plate 12 and the supporting surface of the fixed plate 11, the supporting surface of the other movable plate 12 keeps the first included angle with the supporting surface of the fixed plate 11 under the action of the transmission assembly 2 and the synchronous assembly 3, so that folding amounts of the two movable plates 12 movably connected at both sides of the fixed plate 11 are equal. In this way, when the flexible display screen needs to be folded in half, the included angles between the supporting surfaces of the two fixed plates 11 and the supporting surface of the movable plate 12 are always equal, so that the flexible display screen covered on the surfaces of the two fixed plates 11 can be completely attached, such that a distance between the bottom surfaces of the two fixed plates 11 is further reduced, which is beneficial to reducing a folded volume of the supporting module, and is beneficial to lightweight development of the supporting module. Meanwhile, as the included angles between the supporting surfaces of the two fixed plates 11 and the supporting surface of the movable plate 12 are always equal, the inclination angles of the two folded surfaces of the folded flexible display screen are equal, so that supporting forces and traction forces of the two fixed plates 11 on the flexible display screen are equal, which is beneficial to lightening the creases of the flexible display screen.

In addition, when the supporting middle frame further includes the connecting plate 13, in the process of rotation, the middle frame rotates to drive the connecting plate 13 to rotate, the pin 22 slides in the connecting plate 13 to drive the tooth arm 21, and at the same time, the pin 22 also slides in the movable plate 12. Because the arc guiding rail arranged on the movable plate 12 can rotate around the axis of the installation cavity, the connecting plate 13 and the movable plate 12 are movably connected, the movable plate 12 also moves, such that the connecting plate 13 rotates in a non-arc manner. In this way, during the folding process, the flexible display screen may form a water drop shape under the action of the movable plate 12, so that the supporting surface of the movable plate 12 is always stick close to the flexible display screen, and the folding process of the flexible display screen is compensated, so that a gap between the supporting surface of the movable plate 12 and the flexible display screen can be reduced, and creases of the folded flexible display screen can be reduced.

In a second aspect, the embodiments of the present disclosure further provide a display module, wherein the display module includes a flexible display screen and the supporting module according to any embodiment of the first aspect. The flexible display screen covers the supporting surface of the movable plate 12 and the supporting surface of the fixed plate 11. The beneficial effects of the display module are the same as those of the above-mentioned supporting module, which will not be described in detail in the embodiments of the present disclosure.

In a third aspect, the embodiments of the present disclosure further provide a display device, wherein the display device includes the display module according to the second aspect. The beneficial effects of the display device are consistent with those of the above-mentioned supporting module, which will not be described in detail in the embodiments of the present disclosure.

In addition, it should be noted that the display device in the embodiments of the present disclosure may be a mobile display device or a non-mobile display device. For example, the mobile display device may be a mobile phone, a tablet computer, a notebook computer, a palmtop computer, a vehicle-mounted display device, a wearable device, an ultra-mobile personal computer (UMPC), a netbook, a personal digital assistant (PDA), and the like, and the non-mobile display device may be a personal computer (PC), a television (TV), an ATM or a self-service machine, and the like, which are not specifically limited in the embodiments of the present disclosure. It should also be noted that when the size of the flexible display screen of the display device in the embodiment of the present disclosure is large, a plurality of supporting modules may be applied in parallel under the flexible display screen to realize the folding of the large-size flexible display screen.

It should be noted that, the term "includes", "includes" or any other variation thereof herein is intended to cover non-exclusive inclusion, so that a process, method, goods or device that includes a set of elements includes not only those elements but also other elements not explicitly listed, or include elements inherent to the process, method, object, or device. In the absence of further restrictions, the limited element stated by "including a . . . " does not preclude the existence of another identical element in a process, method, goods or device that includes the element. In addition, it should be noted that the scope of methods and devices in the embodiment of the present disclosure does not limit the execution of functions in the order indicated or discussed, but may also include the execution of functions in a substantially simultaneous manner or in reverse sequence according to the functions involved, for example, the methods described may be performed in a different order than described. Various steps can also be added, omitted, or combined. In addition, characteristics described in reference to some examples can be combined in other examples.

By describing the embodiments above, a person skilled in the art can clearly understand that the above embodiments can be realized by means of software and the necessary common hardware platform, of course, can also be through hardware, but in many cases the former is the better embodiments. Based on this understanding, the technical solution of the present disclosure may be essentially or contribute to the prior art in the form of a computer software product stored in a storage medium (e.g., ROM/RAM, diskette, compact disc) containing some instructions to enable a terminal (may be a mobile phone, computer, server or network equipment, etc.) to execute the methods described in the embodiment of the present disclosure.

The embodiments of the present disclosure are described in combination with the drawings. However, the present disclosure is not limited to the above specific embodiments, which are only indicative rather than restrictive. Under the inspiration of the present disclosure, a person skilled in the art can also make many forms without deviating from the scope protected by the purposes of the present disclosure and the claims are covered by the present disclosure.

The invention claimed is:

1. A supporting module for supporting a flexible display screen, wherein the supporting module comprises a supporting assembly, transmission assemblies and a synchronous assembly;

the supporting assembly comprises a fixed plate and movable plates, and both sides of the fixed plate are hinged with one movable plate;

the synchronous assembly is fixed on the fixed plate, and the transmission assemblies are located at a bottom of the movable plate and a bottom of the fixed plate;

a bottom surface of each movable plate is movably connected to a first end of one transmission assembly, and second ends of the transmission assemblies located at both sides of the fixed plate are movably connected to the synchronous assembly;

when a first included angle is disposed between a supporting surface of one movable plate and a supporting surface of the fixed plate, a supporting surface of the other movable plate keeps the first included angle with the supporting surface of the fixed plate under an action of the transmission assembly and the synchronous assembly;

wherein the supporting surface of the movable plate and the supporting surface of the fixed plate are both surfaces for supporting the flexible display screen, and the bottom surface of the movable plate is one surface opposite to the supporting surface of the movable plate;

wherein the transmission assembly comprises a tooth arm and a pin, the synchronous assembly comprises a synchronous gear set, and the bottom surface of the movable plate is provided with a first supporting lug;

a first end of the tooth arm is provided with a hinging hole, a second end of the tooth arm is a tooth surface, and an axis of the hinging hole is parallel to an axis of any gear in the synchronous gear set;

the first supporting lug protrudes from the bottom surface of the movable plate, a first arc chute is formed in the first supporting lug, and the pin passes through the hinging hole and the first arc chute, so that the first end of the tooth arm is hinged with the movable plate; and any one of the two gears in the synchronous gear set is meshed with the second end of one tooth arm.

2. The supporting module according to claim 1, wherein the synchronous assembly further comprises a synchronous rod; and the second end of the tooth arm is provided with a through hole, and both ends of the synchronous rod are both fixedly connected to one tooth arm through the through hole.

3. The supporting module according to claim 2, wherein cross sections of a first position and a second position of the synchronous rod along a direction perpendicular to an axis of the synchronous rod are non-circular cross sections; and a hole shape of the through hole is consistent with a shape of the non-circular section, and the first position and the second position are positions at which the synchronous rod and the tooth arm are matched and connected.

4. The supporting module according to claim 1, wherein the supporting assembly further comprises a connecting plate;
   a bottom surface of the connecting plate is provided with a second supporting lug, and the second supporting lug protrudes from a bottom surface of the connecting plate;
   the second supporting lug is provided with a second arc chute, the connecting plate is movably connected to the bottom of the movable plate, projections of the first supporting lug and the second supporting lug on a first plane along an axis direction of the pin are overlapped, and projections of the first arc chute and the second arc chute on the first plane along the axis direction of the pin are overlapped, wherein the first plane is a plane perpendicular to the movable plate;
   the pin passes through the first arc chute and the second arc chute, so that the first end of the tooth arm is hinged with the connecting plate; and
   the connecting plate is configured for fixing a middle frame of the flexible display screen.

5. The supporting module according to claim 4, wherein the fixed plate comprises a supporting seat and a back cover, and a side edge of the movable plate close to the fixed plate is provided with an arc guiding plate;
   the supporting seat and the back cover are connected to form an installation cavity;
   the synchronous assembly is installed in the installation cavity, and the arc guiding plate is movably connected in the installation cavity; and
   the arc guiding plate is provided with an arc surface, the arc surface is projected into an arc shape on the flexible display screen along a first direction, and the first direction is a direction perpendicular to the flexible display screen.

6. The supporting module according to claim 5, wherein the back cover is semi-cylindrical.

7. The supporting module according to claim 4, wherein the bottom surface of the movable plate is provided with a first arc guiding groove and a first arc guiding block;
   the bottom surface of the connecting plate is provided with a second arc guiding groove and a second arc guiding block; and
   the first arc guiding block is embedded in the second arc guiding groove, and the second arc guiding block is embedded in the first arc guiding groove.

8. The supporting module according to claim 7, wherein the bottom surface of the movable plate or the bottom surface of the connecting plate is provided with at least two convex blocks; and
   the first arc guiding groove or the second arc guiding groove is formed between the two convex blocks at intervals.

9. The supporting module according to claim 7, wherein a shape of a projection of the first arc guiding groove on the flexible display screen is the same as a shape of a projection of the second arc guiding groove on the flexible display screen.

10. The supporting module according to claim 1, wherein the supporting assembly further comprises a torsion assembly; and
    the torsion assembly is arranged between two synchronous gear sets, and the torsion assembly is configured for providing a rotating friction for the synchronous gear set, and a direction of the rotating friction is opposite to a rotating direction of the synchronous gear set.

11. The supporting module according to claim 10, wherein the torsion assembly comprises an elastic piece, a cam and a connecting rod, and the synchronous gear set comprises two rotating gears which are meshed with each other;
    both ends of the connecting rod are connected to one rotating gear, one synchronous gear set is matched and connected to one cam, and the elastic piece is arranged between the two cams;
    when the first included angle is disposed between the supporting surface of the movable plate and the supporting surface of the fixed plate, the cam presses the elastic piece, and a compression amount of the elastic piece is a first compression amount; and
    when the supporting surface of the movable plate and the supporting surface of the fixed plate are in the same plane, the cam presses the elastic piece, the compression amount of the elastic piece is a second compression amount, and the first compression amount is greater than the second compression amount.

12. The supporting module according to claim 11, wherein an end face of the rotating gear facing the elastic piece is provided with a convex tooth, and the convex tooth is matched and connected to a cross section of the cam.

13. The supporting module according to claim 11, wherein the elastic piece is a spring or a compression disc spring.

14. A display module, wherein the display module comprises a flexible display screen and the supporting module according to claim 1; and
    the flexible display screen is covered on the supporting surface of the movable plate and the supporting surface of the fixed plate.

15. A display device, wherein the display device comprises the display module according to claim 14.

16. The display module according to claim 14, wherein the synchronous assembly further comprises a synchronous rod; and
    the second end of the tooth arm is provided with a through hole, and both ends of the synchronous rod are both fixedly connected to one tooth arm through the through hole.

17. The display module according to claim 16, wherein cross sections of a first position and a second position of the synchronous rod along a direction perpendicular to an axis of the synchronous rod are non-circular cross sections; and
    a hole shape of the through hole is consistent with a shape of the non-circular section, and the first position and the second position are positions at which the synchronous rod and the tooth arm are matched and connected.

18. The display module according to claim 14, wherein the supporting assembly further comprises a connecting plate;
    a bottom surface of the connecting plate is provided with a second supporting lug, and the second supporting lug protrudes from a bottom surface of the connecting plate;
    the second supporting lug is provided with a second arc chute, the connecting plate is movably connected to the bottom of the movable plate, projections of the first supporting lug and the second supporting lug on a first plane along an axis direction of the pin are overlapped, and projections of the first arc chute and the second arc chute on the first plane along the axis direction of the pin are overlapped, wherein the first plane is a plane perpendicular to the movable plate;

the pin passes through the first arc chute and the second arc chute, so that the first end of the tooth arm is hinged with the connecting plate; and the connecting plate is configured for fixing a middle frame of the flexible display screen.

\* \* \* \* \*